March 25, 1930.  A. S. FITZ GERALD  1,752,247

CONVERTING APPARATUS

Filed April 18, 1929

Inventor:
Alan S. FitzGerald
by Charles E. Tullar
His Attorney

Patented Mar. 25, 1930

1,752,247

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

CONVERTING APPARATUS

Application filed April 18, 1929. Serial No. 356,223. REISSUED

My invention relates to converting apparatus such as that utilized to transmit power between alternating and direct current circuits, and has for its principal object the provision of an improved inverter or power converting apparatus which is simple and inexpensive.

In the past, various types of apparatus including electrical valves have been provided for transmitting power between direct and alternating current circuits or between circuits operating at different frequencies. Many of these apparatus have the disadvantage that they are too complicated and costly to be of practical value. In accordance with my invention, this difficulty is avoided by the provision of a power converting apparatus wherein a capacitor is connected in series with the load circuit and the charging and discharging currents of the capacitor are transmitted through different electrical valves.

My invention will be better understood from the following description when considered in connection with the accompanying drawings and its scope will be pointed out in the appended claims.

Figure 1:
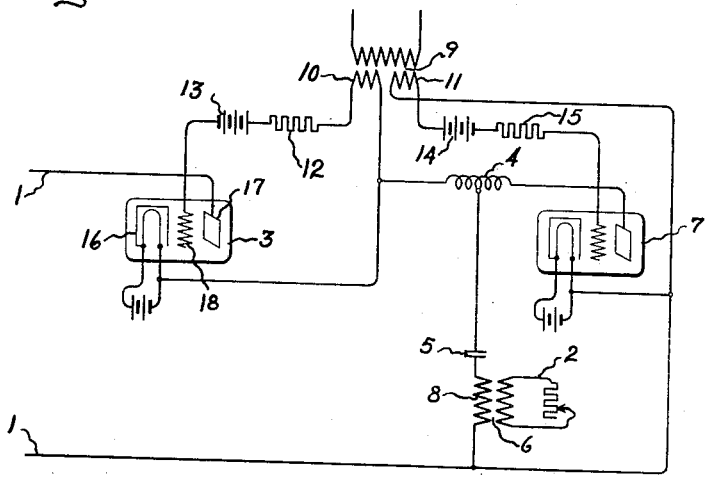
Figure 2:
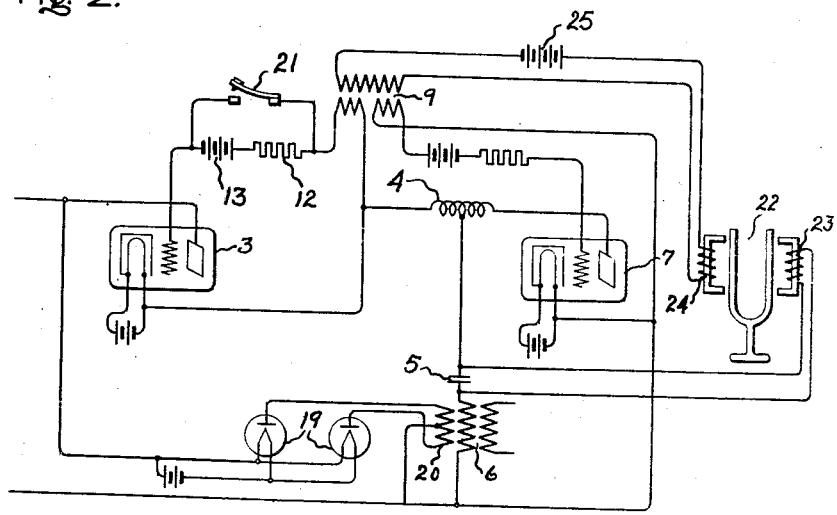

Referring to the drawings, Figure 1 illustrates an apparatus wherein my invention is utilized for the purpose of converting direct current to alternating current; and Figure 2 illustrates an apparatus similar to that of Figure 1 with the exception that means are provided for feeding power back into the direct current circuit during light load operation of the apparatus and for causing the apparatus to operate independently of an external source of grid control potential.

The apparatus of Figure 1 includes a direct current circuit 1 and an alternating current circuit 2 which are interconnected through an electrical valve 3, the left hand end of a reactor 4, a capacitor 5 and a transformer 6. A circuit including the right hand half of the reactor 4 and an electrical valve 7 is connected in shunt to the capacitor 5 and the primary winding 8 of the transformer 6.

The apparatus may oscillate at a frequency dependent on its circuit constants or may be synchronously driven. When it is synchronously driven, alternating control potential is applied to the grids of the electrical valves 3 and 7 through a transformer 9 which is provided with two secondary windings 10 and 11. The grid circuit of the valve 3 includes the secondary winding 10, a resistor 12 and a negative bias battery 13. The grid circuit of the valve 7 includes the secondary winding 11, a negative bias battery 14 and a resistor 15.

The valves 3 and 7 are preferably of the vapor electric type. It is well known to those skilled in the art that such valves may be so constructed that they will not pass current until the grid is made positive with respect to the anode. For example, the valve 3 may be so constructed that current will not start to flow between its cathode 16 and anode 17 until the potential of its grid 18 is made positive with respect to that of the cathode 16. After the anode current of the valve has started, the grid potential has no further influence. When the anode current is brought to zero by some external agency, however, it cannot start again until the grid potential is made more positive than that of the cathode. With the illustrated grid potential control arrangement, the grid potential of the valve 3 is positive when that of the valve 7 is negative and vice versa.

During the operation of the apparatus, the capacitor 5 is successively charged through the valve 3 and discharged through the valve 7. Thus when the grid potential of the valve 3 is positive, current is supplied to the capacitor 5 through the valve 3, the left hand portion of the reactor 4 and the primary winding 8 of the transformer 6. When the grid potential of the valve 7 is positive, the condenser is discharged through right hand portion of the reactor 4 and the primary winding 8. This cycle is repeated at the frequency of the grid excitation potential. Due to the charging and discharging of the capacitor 5, an alternating current flows through the primary winding 8 of the transformer 6 and an alternating voltage is applied to the load circuit 2. The alternating current circuit 2 is thus controlled by the electrical conditions of the charging and discharging circuits and is therefore common to these two circuits.

The function of the reactor 4 is to provide an inductive coupling between the charging and discharging circuits of the capacitor. As previously indicated, the grids of the valves 3 and 7 are incapable of stopping the anode current after it has started. The anode currents of the valves of course stop when the capacitor is fully charged or discharged. If the natural action of the capacitor circuit is not such that the valve current is zero when the potential of the grid potential changes, the starting of current in one valve produces in the reactor 4 a counter-voltage whereby the current of the other valve is suddenly reduced to zero. The danger of short circuit of the direct current circuit 1 directly through the valves 3 and 7 is thus prevented by the reactor 4 which injects a counter-voltage into the anode circuit of one of the valves when current starts through the other valve.

Difficulty is encountered in the operation of the apparatus as the load of the alternating current load circuit 2 approaches zero. As indicated by Figure 2, this difficulty may be avoided by the provision of a feed-back circuit including rectifiers 19 and an additional secondary winding 20 on the transformer 6. Under these conditions, power is fed back into the circuit 1 when the load voltage tends to rise and interruption in the operation of the apparatus is avoided. It will of course be understood that any other suitable means, such as glow tubes or a resistance connected in parallel with the alternating current load, may be utilized for insuring operation of the apparatus at light loads.

In the arrangement of Figure 2 the apparatus is also provided with means for causing it to operate either at a predetermined frequency or at a frequency which is dependent on its circuit constants. This arrangement includes a switch 21 which is connected in shunt to the resistor 12 and the bias battery 13 for starting the apparatus into oscillation. In order to cause the oscillations of the apparatus to be maintained at a predetermined frequency a tuning fork 22 is provided. This tuning fork is provided with a coil 23 connected in shunt to the capacitor 5 and with a coil 24 connected through a battery 25 to the primary circuit of the transformer 9. With these connections the operating frequency of the apparatus is determined in a well known manner by the free vibration period of the tuning fork 22. If constancy in the operating frequency of the apparatus is unnecessary, the tuning fork may be disconnected and the apparatus permitted to operate at a frequency which is dependent on the inductance and capacity of its circuits.

What I claim as new and desire to secure by Letters Patent of the United States, is:

1. The combination of a plurality of electrical valves, a capacitor, a capacitor charging circuit including one of said valves, a capacitor discharging circuit includng another of said valves, and an alternating current circuit common to said charging and discharging circuits.

2. The combination of a plurality of electrical valves, a capacitor, a capacitor charging circuit including one of said valves, a capacitor discharging circuit including another of said valves, an alternating current circuit common to said charging and discharging circuits, and means for successively changing the conductivities of said valves.

3. The combination of a plurality of vapor electric devices each provided with a grid for controlling the starting of current between its cathode and anode, a capacitor, capacitor charging and discharging circuits each including a different one of said valves, and an alternating current circuit common to said charging and discharging circuits.

4. The combination of a plurality of vapor electric devices each provided with a grid for controlling the starting of current between its cathode and anode, a capacitor, capacitor charging and discharging circuits each including a different one of said valves, and an alternating current circuit common to said charging and discharging circuits, and means for applying alternating potentials of opposed polarities to said grids.

5. The combination of a plurality of vapor electric devices each provided with a grid for controlling the starting of current between its cathode and anode, a capacitor, capacitor charging and discharging circuits each including a different one of said valves, means arranged to provide in each of said circuits a counter-voltage which is dependent on the current in the other of said circuits, and an alternating current circuit common to said charging and discharging circuits.

6. The combination of a plurality of vapor electric devices each provided with a grid for controlling the starting of current between its cathode and anode, a capacitor, capacitor charging and discharging circuits each including a different one of said valves, means arranged to produce in each of said circuits a counter-voltage which is dependent on the current in the other of said circuits, an alternating current circuit common to said charging and discharging circuits, and means arranged to transmit power from said alternating current circuit to said capacitor charging circuit.

7. The combination of a plurality of vapor electric devices each provided with a grid for controlling the starting of current between its cathode and anode, a capacitor, capacitor charging and discharging circuits each including a different one of said valves, an alternating current circuit common to said capacitor charging and discharging circuits, and means for transmitting power from said alternating current circuit to said capacitor charging circuit.

In witness whereof, I have hereunto set my hand this 17 day of April, 1929.

ALAN S. FITZ GERALD.